UNITED STATES PATENT OFFICE.

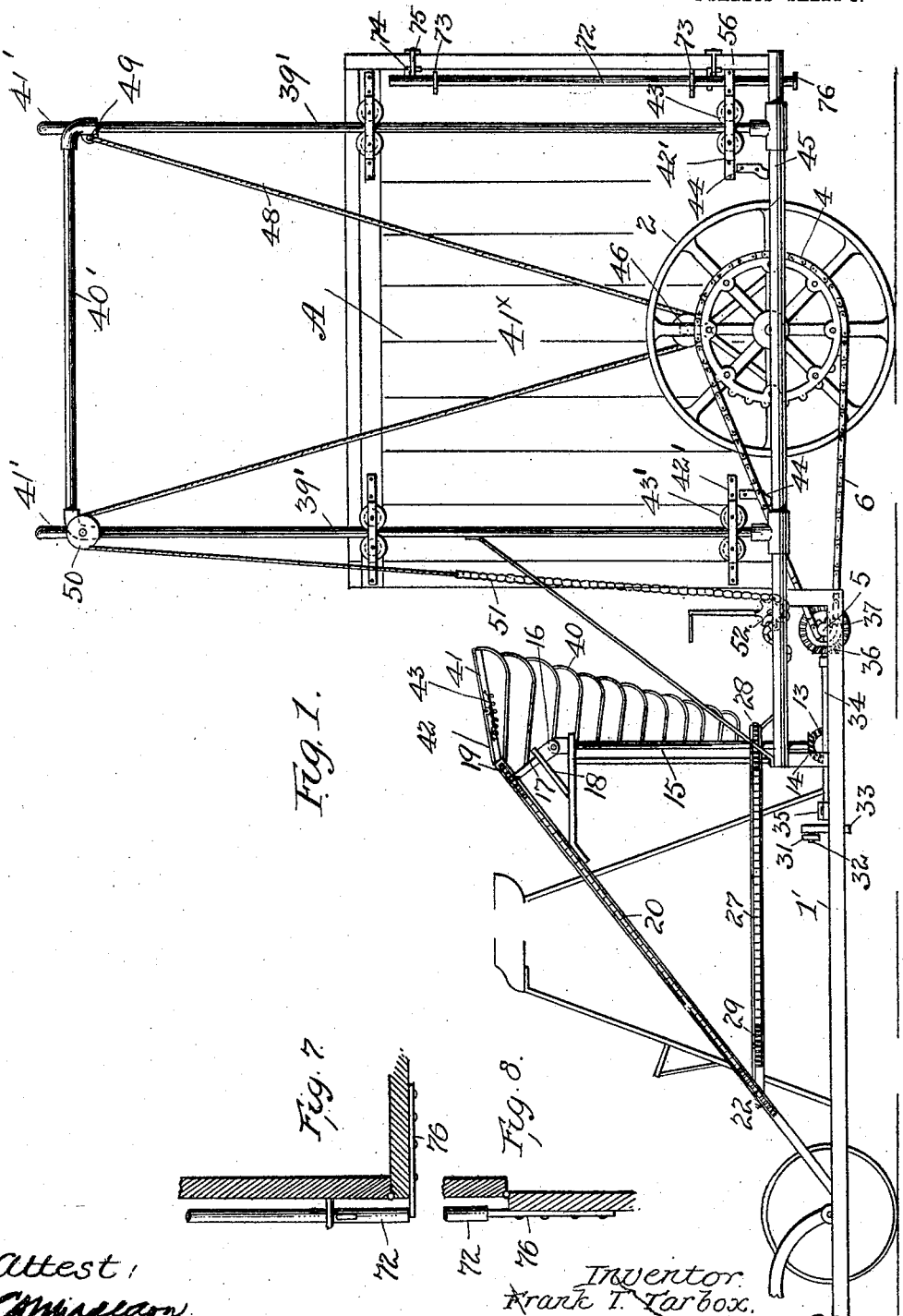

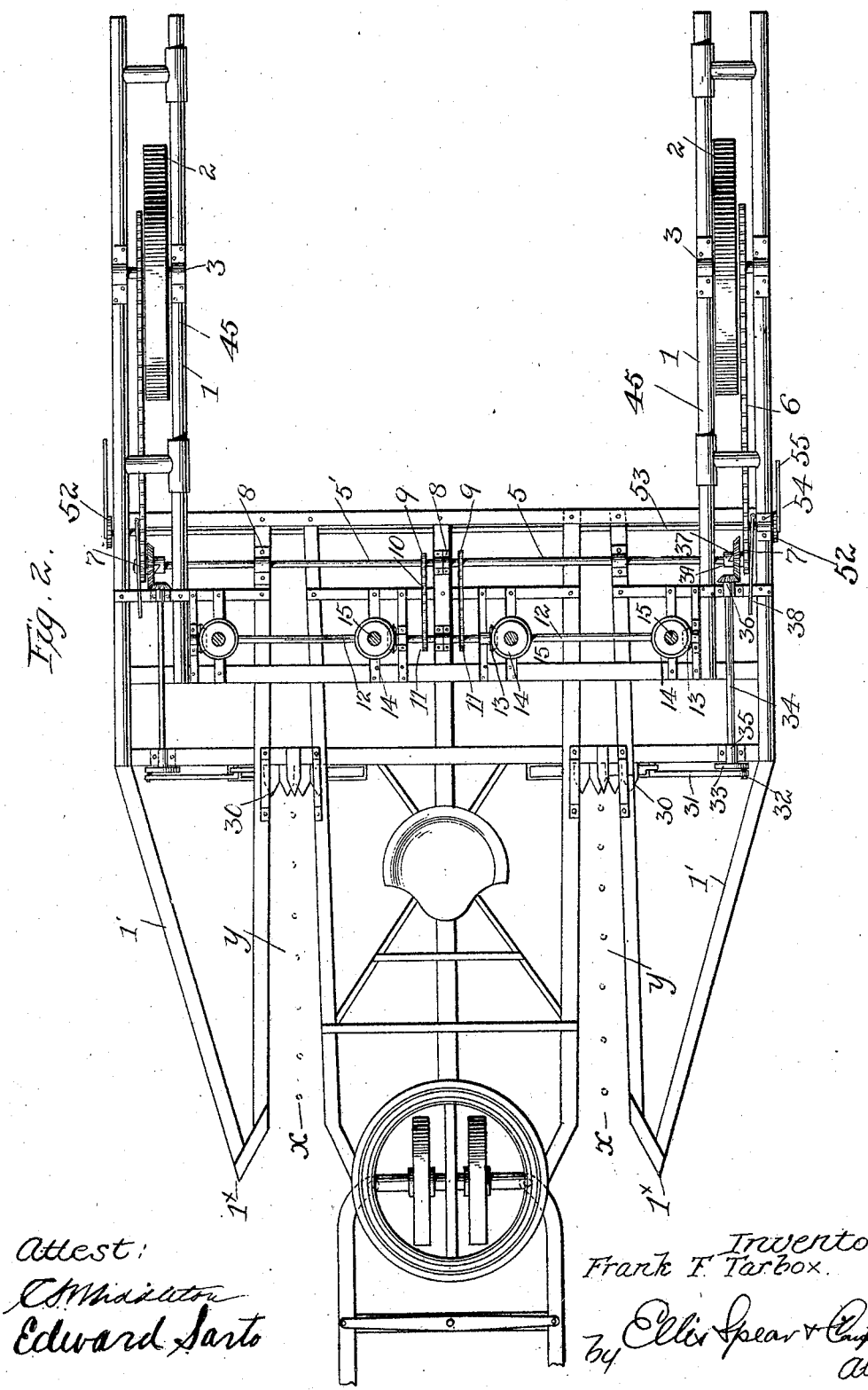

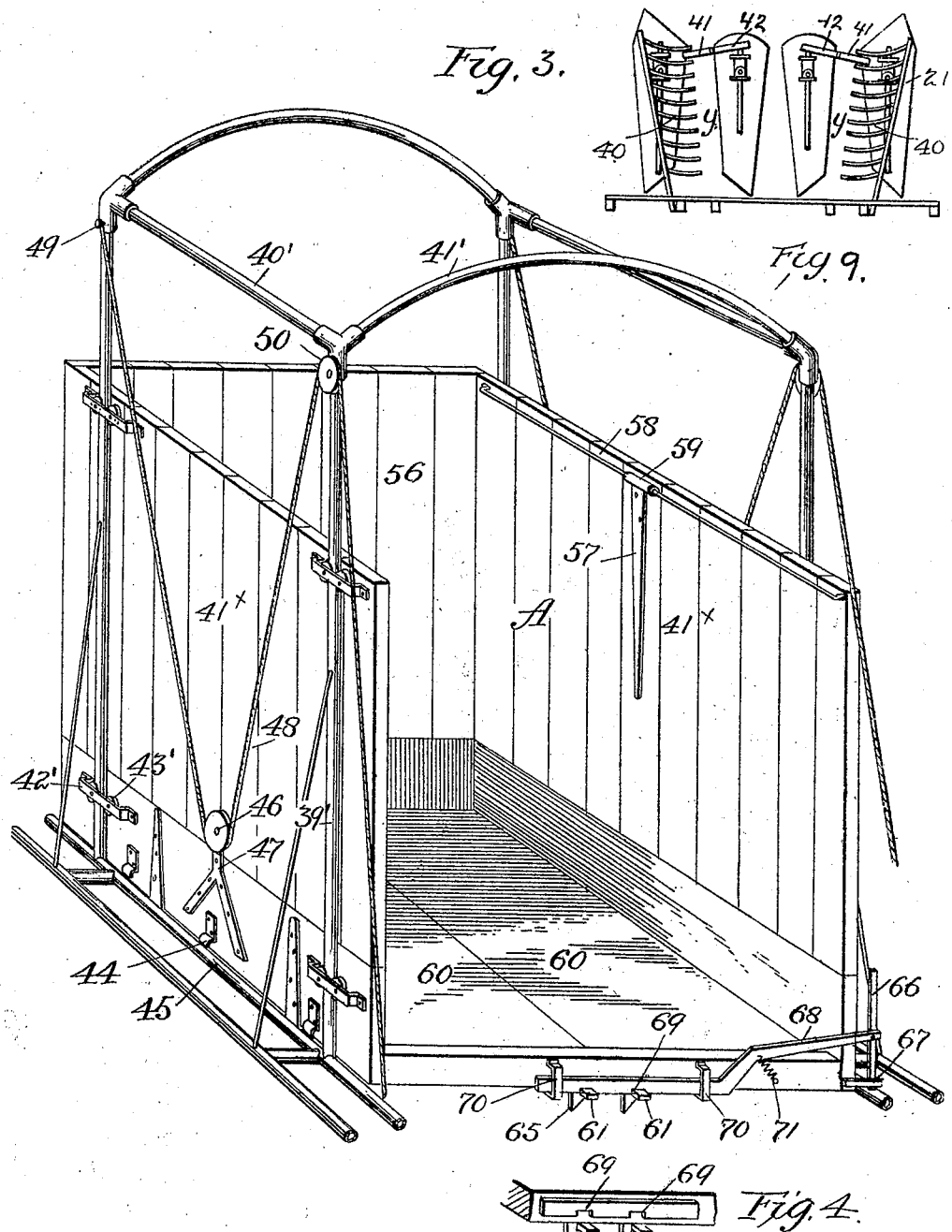

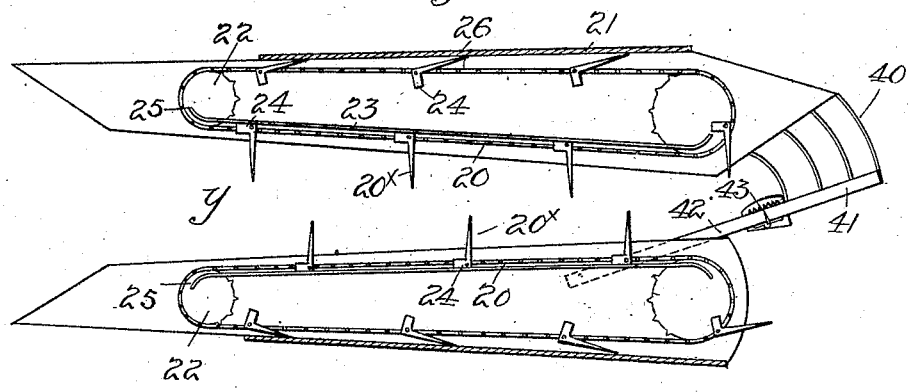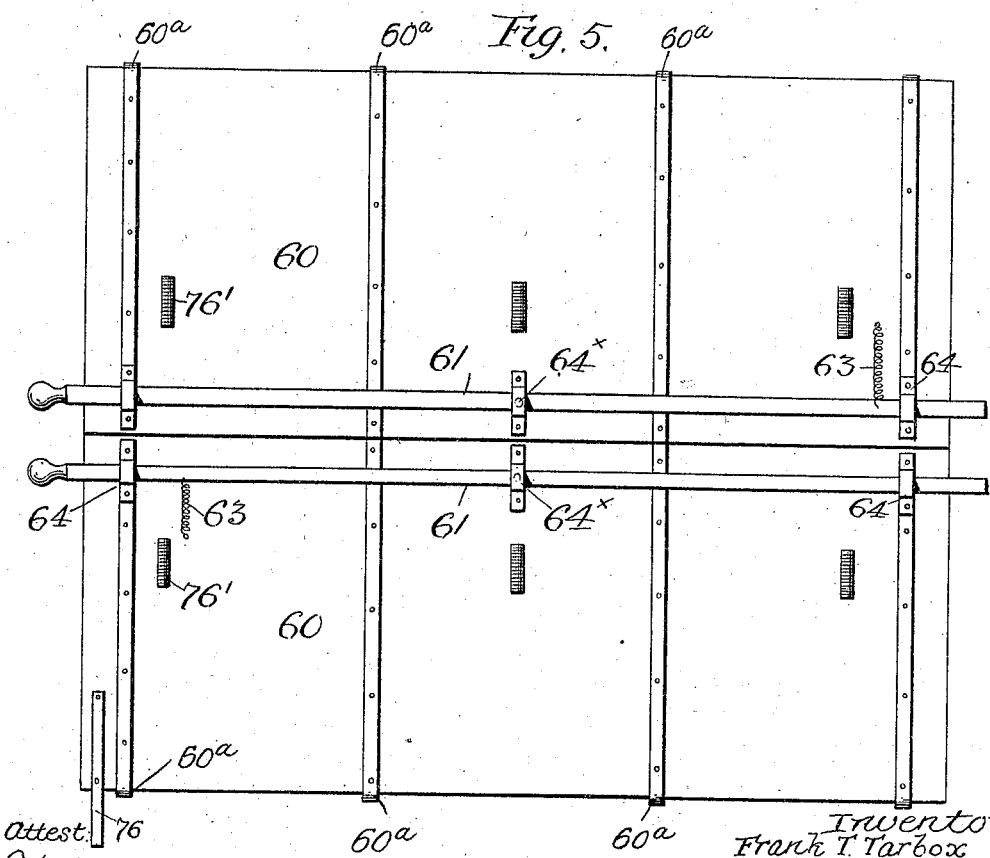

FRANK T. TARBOX, OF XENIA, OHIO.

CORN-HARVESTER.

No. 805,938.      Specification of Letters Patent.      Patented Nov. 28, 1905.

Application filed October 6, 1903. Serial No. 175,962.

*To all whom it may concern:*

Be it known that I, FRANK T. TARBOX, a citizen of the United States, residing at Xenia, Greene county, Ohio, have invented certain new and useful Improvements in Corn-Harvesters, of which the following is a specification.

My invention relates to machines for cutting and shocking corn; and it includes mechanism for cutting the standing corn, means whereby the cut stalks are collected, means whereby the collected stalks may be assembled into the form of a shock, and means whereby the corn in the form of a shock may be dropped from the machine.

The invention consists in the features and combination and arrangement of parts hereinafter described, and particularly pointed out in the claims.

In the accompanying drawings, Figure 1 is a side view of a machine embodying my invention. Fig. 2 is a plan view of the machine with parts omitted. Fig. 3 is a perspective view of the cage or receptacle in which the stalks are assembled into shocks. Fig. 4 is a detail view relating to Fig. 3. Fig. 5 is a plan view of the bottom of the shocker-cage, showing the doors thereof. Fig. 6 is a plan view of one set of carriers for the stalks, partly in section. Fig. 7 is a detail view taken from the rear of the lower part of the cage, showing the lower door ready to operate the locking-bar 72. Fig. 8 is a further detail view showing the parts of Fig. 7 in their operated position. Fig. 9 is a detail rear view of the collector mechanism.

The general construction of the machine is best shown in Figs. 1 and 2, and it comprises a main frame 1, having forward extensions 1', which latter are of angular form and have their points $1^\times$ arranged as dividers for the corn. The main frame 1 is carried by ground-wheels 2, the axles of which are journaled in bearings 3 thereon, said axles carrying sprocket-wheels 4, from which shafts 5 5' are driven through sprocket-chains 6, passing over sprocket-wheels 7 on the said shafts 5 5'. These shafts are axially in line with each other, one serving for one side of the machine and the other for the other side of the machine. These shafts 5 5' are journaled in bearings 8 on the frame, and near their meeting ends each is provided with a sprocket-wheel 9, which through a sprocket-chain 10 drives sprocket-wheels 11 on shafts 12, journaled in the frame, said shafts 12 extending horizontally and having beveled pinions 13 thereon which mesh with beveled gears 14 on upright shafts 15, said upright shafts being connected by a universal joint 16 with inclined stub-shafts 17, journaled in a bearing 18 on the frame, Fig. 1, the said stub-shafts carrying sprocket-wheels 19, about which carrier-chains 20 extend, said carrier-chains, as shown in Fig. 1, extending in an inclined position within boxes or casings 21, Fig. 6, the lower ends of the said carrier-chains extending around sprocket-wheels 22, journaled in the casings.

By reference to Fig. 2 the rows of corn (indicated at $x\ x$) are received in the spaces $y$ in the frame, said spaces representing the spaces between the carriers, as shown in Fig. 6. In other words, a pair of carriers comprising a pair of chains 20, with carrier-arms $20^\times$ pivoted thereon, are arranged at each of the spaces $y$, one carrier-chain being on one side of each of the said space and the other chain upon the other side thereof. The casings 21 are open on their adjacent faces, as shown in Fig. 6, or on the faces next to the spaces $y$, and the carrier-arms $20^\times$ are held outwardly, so as to extend in a direction across the space $y$, by a track 23, Fig. 6, arranged within the case, said track being adapted to be borne upon by the heel 24 of the carrier-arm when the same reaches the point 25. The carrier-arm in this position will engage the cornstalk and direct the same to the rear. As shown in Fig. 6, the members of each pair of casings diverge slightly from each other toward the front, so that they will with certainty receive the cornstalks between them, and as the carrier-arms on adjacent carriers approach each other they will with certainty engage the cornstalks. The casings for the carriers are closed, as at 26, and the carrier-arms in passing toward the front are folded inwardly by the said closed side of the casing. As shown in Fig. 1, horizontal carrier-chains 27 are employed, driven by sprocket-wheels 28 on the upright shafts 15, the said carrier-chains passing around sprocket-wheels 29. These chains, with their casings and carrier-arms, are like in all respects the carriers above referred to, with the exception that they are arranged horizontally instead of at an inclination. Of these horizontal carriers there is a pair for each of the spaces $y$ for receiving the cornstalks, and these horizontal carriers assist the inclined carriers in controlling the cornstalks, for they engage the lower portions of the stalks while the inclined carriers at their upper ends engage the upper portions of the stalks. As the stalks move backwardly along the receiving spaces or channels $y$ they encounter the cutting mechanism, comprising the toothed cutters 30, one set of cutters, as shown in Fig. 2, being used for each of the channels $y$ and said cutters being operated by pitmen 31, pivoted to crank-pins 32 of disks 33 on shafts 34, journaled in the frame at 35, the said shafts being rotated through gearing 36 37 from the shafts 5 5', before mentioned. The gears 37 are arranged to be shifted by levers 38 into and out of connection with a suitable clutch, (indicated generally at 39 on the shafts 5 5'.) The cut stalks are moved by the carriers to the rear and are collected in the form of bundles against gratings 40, one for each pair of carriers, said gratings consisting of curved arms arranged at the rear end of the carrier mechanism and attached in any suitable way. The collecting of the stalks against this grating is assisted by an arm 41, pivotally connected to a bracket 42 and under tension of a spring 43, tending to hold the said arm in extended position, as shown in Fig. 6, so that the cornstalks may collect against the grating and be held by the said arm. After a sufficient number of stalks have been thus collected against the grating 40 an attendant by placing his arm between the arms of the grating may grasp the bundle of stalks collected against the grating and remove the same therefrom, and in this action the pivoted arm 41 will yield on its pivot to allow the removal of the bundle of stalks. The attendant carries this bundle of stalks toward the rear of the machine and into a shocker cage or box, (represented generally at A, Figs. 1 and 3.) This shocker cage or box is of substantially rectangular form minus a front side and cover. It is arranged within a suspension-frame consisting of uprights 39', extending from the main frame on the machine, said uprights being connected, as shown in Fig. 3, by rods 40' at their upper ends and by arches 41', extending transversely in relation to the machine. The sides $41^\times$ of the cage or box are provided with brackets 42', in which are journaled rollers 43', having concave peripheries adapted to run on the rounded surfaces of the uprights 39'. The cage when in normal position rests on the main frame of the machine, and it is preferably provided with brackets 44, secured to its sides and adapted to engage the side bars 45 of the main frame and sustain the weight of the cage. The cage is adapted to be elevated in order to discharge the shock, as will be hereinafter more particularly described, and for this purpose it is provided with a pulley 46 on the outer face of each of its sides, said pulleys being journaled in brackets 47 and having each a grooved periphery receiving a rope 48, which is attached at point 49 rigidly to the suspension-frame, passing thence under the pulley 46, then up and over a pulley 50 on the suspension-frame, from whence the said cord extends to a sprocket-chain 51, which passes under a sprocket-wheel 52, fixed to a shaft 53, extending from side to side of the machine and journaled in boxes 54 on the main frame. It will be understood that there is one of these suspending-cords, sprocket-chains, and sprocket-wheels on each side of the machine and the shaft 53 is provided on each of its ends with a crank-handle 55, so that by turning the shaft 53 the suspending-cords on each side of the machine will be operated and the cage raised from the position shown in Figs. 1 and 3 for the purpose of discharging the shock. As before stated, the attendants carry the armsful of stalks from the collecting-gratings at the rear of the carriers into the shocking cage or box, and they pack the bundles of stalks against the rear wall or door 56, Fig. 3, of the cage, and the stalks are held as thus packed by arms 57, one on each side of the shocker-cage, said arms being supported by rods 58, secured to the inner sides of the side walls of the cage near the upper edge thereof and extending from front to rear. The arms 57 are loosely pivoted to the said rods, and they have each a long bearing 59 slidable thereon. By exerting pressure on the arms 57 near their pivots they may be pushed to the rear against the cornstalks to press the same closely together and upon relieving the said arms of the pressure mentioned they will remain in the positions to which they have been adjusted because of the back pressure exerted upon the said arms at or near their outer ends by the cornstalks, said pressure causing the long bearing to bind on the rod 58, and thus hold the arms in place. When the arms are not in use, they hang down, as shown in Fig. 3, close against the inner wall of the cage; but when in use they extend transversely and preferably horizontally of the cage and bear against the cornstalks. It will be seen that a shock of any desired size may be made within the shocker-cage by adjusting the pressure-arms. The filling of the shocker-cage to the desired extent takes place while it is in its lowermost position. After the shock has been formed and it is desired to discharge the same the cage is elevated through the means before described, and the doors 60, forming the bottom of the cage, are released, so that they may fall down each into a vertical position. The doors are hinged along their side edges to the frame of the cage, and their free edges when the doors are closed meet at the center of the cage-bottom. They are held in closed position by bars 61, extending parallel with and arranged adjacent the free edges of the said doors and on the under sides of the same, the said bars being pivoted at their intermediate points, as at $64^\times$, and being under tension of springs 63. The bars are held or guided by straps 64 on the under sides of the doors. The bars 61 engage hooks 65, Figs. 3 and 4, carried by the frame, and these hooks and bars serve to hold the doors in closed position. When, however, a shock of the desired size has been made and it is desired to discharge the same, the cage is elevated, as before described, and the attendant operates a hand-lever 66, pivoted in a bracket 67 on the frame, said hand-lever being pivoted to an arm 68, extending in a direction transversely of the cage and having notches 69 engaging the locking-bars 61, so that the notched bar 68 will be drawn longitudinally, and thus withdraw the bars 61 from the hooks 65, and the doors 60 will then swing downwardly into vertical positions by their own weight and the weight of the shock, and the said shock will be deposited in standing position upon the ground. The notched bar 68 is guided by straps 70 on the frame, and it is pressed downwardly by a spring 71 to engage the locking-bars 61 when the doors 60 are again closed. The rear wall or door 56 of the cage is hinged to the cage at one side thereof, and it is held in closed position by a locking-bar 72, Fig. 1, extending vertically on the outer side of the cage and guided in brackets 73 thereon, the said locking-bar having hooks 74, adapted to engage eyes 75, carried by the said rear door 56. The locking-bar 72 has its lower end arranged to be struck by an arm 76, Figs. 1 and 5, projecting from one of the lower doors, so that when the said lower or bottom door falls into open position the arm 76 will raise the locking-bar 72 and release the rear door 56, so that the same may open, and thus permit the machine to pass on without disturbing the shock which has just been deposited upon the ground. After the shock has been deposited as above described the cage, the hinge-eyes being at the points $60^a$, Fig. 5, is lowered, the doors are closed, and the machine is driven forward for repeating the operation of cutting, collecting, shocking, and depositing the shock as above described.

The machine will operate on an incline as on a hillside, as well as upon the level, as of course the bottom of the cage will be at the same inclination as the inclination of the ground, or substantially so, and in tying up the shock it is simply necessary to have the axis of the shock vertical, so that the lower end or bottom thereof will be inclined to correspond with the inclination of the ground upon which it is to be deposited.

In closing the bottom doors 60 of the cage the holding-bars 61 will strike the catches 65 and their springs will allow them to yield laterally, so as to engage and be held by the said catches. In this action the operating-lever 68 will yield upwardly when struck by the holding-bars 61, and when these bars are engaged by the catches the locking-lever will be drawn down by its spring 71, so that the notches 69 will receive the holding-bars and the parts will be ready for another operation.

I provide on the under side of the doors 60 rubber buffers 76', adapted to strike any suitable part of the framework and prevent shock to the doors and the machine generally.

I claim—

1. In combination in a machine of the class described, cutting means, carrying means, a collector at the rear end of the carrying means and a cage or box in rear of the collecting means having vertical sides against which the cornstalks are packed, said cage or box being movably supported and means for raising or lowering the same, substantially as described.

2. In combination in a machine of the class described a framework, means for cutting the corn, a vertically-movable cage or box to receive the cut corn, said cage or box having a movable bottom, adapted to open and close the box substantially as described.

3. In combination in a machine of the class described cutting means for the stalks, a vertically-movable cage or box with means for operating the same, said cage or box having a pair of bottom doors hinged to swing down from a closed position with means for controlling the same, substantially as described.

4. In combination in a machine of the class described, cutting means for the cornstalks, a vertically-movable cage or box with means for operating the same vertically to deposit the cornstalks, said cage or box having a movable bottom door swinging downwardly and a rear door with means for controlling the said doors, substantially as described.

5. In combination, cutting means for the cornstalks, a vertically-movable cage or box having a bottom door swinging downwardly and a rear door arranged to be opened and closed, the said rear door being automatically released by the swinging downwardly of the bottom door, substantially as described.

6. In combination, cutting means, a vertically-movable cage or box, a pair of bottom doors, spring-pressed pivoted rods carried by the said doors, catches on the frame to engage the said rods to hold the doors closed and means for releasing the said rods from the catches, substantially as described.

7. In combination, cutting means, a vertically-movable cage or box, a pair of bottom doors, spring-pressed pivoted rods carried by the said doors, catches on the frame to engage the said rods to hold the doors closed and means for releasing the said rods from the catches, said means comprising a lever having notches to engage the said rods, substantially as described.

8. In combination, cutting means, a vertically-movable cage, a hinged bottom door, a rear door, a vertically-movable rod having holding means for the rear door, the said rod being operated to release the rear door by the movement of the bottom door, substantially as described.

9. In combination, cutting means and a cage or box having a rear door a rod extending along its inner side and an arm pivotally and slidably held by the said rod and arranged to hold the stalks between itself and the rear door, said arm being arranged to swing downwardly to occupy a vertical position along the inner side of the cage, substantially as described.

10. In combination in a machine of the class described cutting means, a cage or box arranged to have vertical movement, a suspension-frame, a sprocket-wheel and sprocket-chain, a rope attached at one end to the suspension-frame and passing under the pulley on the cage and thence over a pulley on the suspension-frame and connected to the sprocket-chain and means for operating the sprocket-wheel, substantially as described.

11. In combination in a corn-harvesting machine, cutting mechanism, carrier mechanism, means against which the cut stalks are collected, a vertically-movable cage or box in rear of the said collecting means and into which the attendant carries the stalks from the collecting means and means for raising and lowering the cage in relation to the collecting and carrier means, substantially as described.

In testimony whereof I affix my signature in presence of two witnesses.

FRANK T. TARBOX.

Witnesses:
W. L. MILLER,
E. S. MILLER